United States Patent [19]
Takezawa et al.

[11] Patent Number: 6,147,428
[45] Date of Patent: *Nov. 14, 2000

[54] ROTOR OF ELECTRIC MOTOR

[75] Inventors: Nasaaju Takezawa; Masaharu Uchibori; Keijiro Igarashi; Kazuhiko Arai, all of Gunma-ken, Japan

[73] Assignee: Sanyo Electric Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/059,930

[22] Filed: Apr. 14, 1998

[30] Foreign Application Priority Data

| Apr. 14, 1997 | [JP] | Japan | 9-113559 |
| Apr. 14, 1997 | [JP] | Japan | 9-113560 |
| Sep. 30, 1997 | [JP] | Japan | 9-267443 |

[51] Int. Cl.$^7$ ............ H02K 21/12; H02K 1/00; H02K 1/22
[52] U.S. Cl. ............ 310/156; 310/216; 310/261
[58] Field of Search ............ 310/156, 261, 310/217, 216, 259, 258, 154, 218, 185, 187

[56] References Cited

U.S. PATENT DOCUMENTS

| 4,327,302 | 4/1982 | Hershberger | 310/156 |
| 5,585,680 | 12/1996 | Tsoffka | 310/49 R |
| 5,666,015 | 9/1997 | Uchibori et al. | 310/261 |
| 5,672,926 | 9/1997 | Brandes et al. | 310/181 |
| 5,684,352 | 11/1997 | Mita et al. | 310/156 |

Primary Examiner—Nestor Ramirez
Assistant Examiner—Dang Dinh Le
Attorney, Agent, or Firm—Darby & Darby

[57] ABSTRACT

It is an object to provide a rotor of an electric motor in which an adverse influence due to through holes for caulking and fixing is reduced, and moreover, the number of parts is small and an assembling operation is simple, so that high characteristics can be obtained, which is constructed by: a rotor core constructed by laminating a plurality of iron plates for the rotor; at least two slots which are formed in the rotor core along the axial direction of a rotation axis; and at least four flat permanent magnets which are inserted to the slots, and in which as the permanent magnets, each pair of magnets which face each other between adjacent magnetic poles are arranged in parallel at predetermined intervals so as to sandwich a normal line of the rotor. In addition, the permanent magnet rotor is made to satisfy the condition: L/D being between 0.3 and 1.2 and t/I being between 0.02 and 0.2, wherein L is the thickness of the laminations, D is the diameter of the rotor core, t is the thickness of the permanent magnets, and I is the length of the permanent magnets.

4 Claims, 12 Drawing Sheets

ROTOR OF ELECTRIC MOTOR

BACKGROUND OF THE INVENTION (i) Field of the Invention

The present invention relates to a structure of a rotor of an electric motor which is used in a compressor or the like.

(ii) Description of the Related Art

Hitherto, a rotor of such a kind of an Electric motor for a compressor of this kind, more particularly, a rotor of an electric motor called a brushless DC motor has a structure constructed in such a manner that a rotor core is constructed by laminating a plurality of iron plates for the rotor and caulking and fixing them, four (in case of four poles) magnetic bodies (permanent magnets) are inserted along the outer periphery of the rotor core, and notches are formed among the magnetic bodies on the outer periphery of the rotor core to construct salient poles, thereby preventing a short-circuit of a magnetic flux.

Trough holes to caulk and fix upper and lower non-magnetic end surface members or the like are formed in the iron plates for the rotor of the rotor core. The end surface members, a disk for oil separation, and the like are caulked and fixed to the rotor core by inserting rivets to the through holes.

On the other hand, as shown in FIG. 16, in Japanese Patent Application Laid-Open No. 47-27302, a structure constructed in such a manner that a plurality of flat permanent magnets 100 are radially inserted from the center of a rotor 101 so that those magnetic paths point to the tangent directions has been disclosed.

In the former rotor, however, since the through holes are formed inside the notches, namely, between the magnetic bodies, in case of four or more magnetic poles, the through holes exist on the magnetic paths formed over between the adjacent magnetic bodies (magnetic poles). Consequently, a problem that a magnetic resistance increases in portions of the through holes, so that an output of the motor deteriorates occurs.

In the latter construction, after the four magnets 100 were inserted to four slots 102, respectively, it is necessary to arrange run-out preventing members 103 for preventing that the magnets 100 are run out due to a centrifugal force to the outer periphery. Therefore, the number of parts increases and the operation becomes troublesome. Since there are four magnets, there is a problem such that there is a limitation for a magnetic force and intended characteristics cannot be derived.

SUMMARY OF THE INVENTION

The present invention is made to solve the above conventional technical subjects. It is an object of the invention to provide a rotor of an electric motor in which an adverse influence due to through holes for caulking and fixing is reduced, and moreover, the number of parts is small and an assembling operation is simple, so that high characteristics can be obtained.

According to the invention, there is provided a rotor of an electric motor, comprising: a rotor core constructed by laminating a plurality of iron plates for the rotor; at least two slots which are formed in the rotor core along the axial direction of a rotation axis; and at least four flat permanent magnets which are inserted to the slots, and wherein as the permanent magnets, each pair of magnets which face each other between adjacent magnetic poles are arranged in parallel at predetermined intervals so as to sandwich a normal line of the rotor.

According to the invention, there is provided a rotor of an electric motor, comprising: a rotor core constructed by laminating a plurality of iron plates for the rotor; at least two slots which are arranged in the rotor core along the axial direction of a rotation axis; and at least four flat permanent magnets which are inserted to the slots, and wherein as the permanent magnets, each pair of magnets which face each other between adjacent magnetic poles are arranged in parallel at predetermined intervals so as to sandwich a normal line of the rotor, and each concave vent duct(axial) is formed on the outer periphery between the pair of magnets.

Further, all of the plurality of permanent magnets are formed in the same flat shape and made of materials included ferrite or rare earth.

Eight permanent magnets are inserted to the slots so that an angle (magnetic pole angle) formed between the tips of the outer periphery of the pair of magnets constituting the magnetic pole and the center of the rotor lies within a range from 55 to 70 degrees.

Further, the rotor has: end surface members for closing the slots formed on both of the end surfaces of the rotor core; a plurality of through holes which pierce through both of the end surface members and the rotor core along the rotational axial direction; and rivets for uniting the both end surface members and the rotor core by using the through holes, and the through holes are formed between the pair of magnets which face each other between adjacent magnetic poles.

The rotor has: end surface members for closing the slots formed on both of the end surfaces of the rotor core; a plurality of through holes which pierce through both of the end surface members and the rotor core along the rotational axial direction; and rivets for uniting the both end surface members and the rotor core by using the through holes, and each of the through holes is formed between the pair of magnets which face each other between adjacent magnetic poles and each vent duct having a diameter that is smaller than that of the through hole is formed on the center portion of the magnetic pole.

Further, the rotor has: end surface members for closing the slots formed on both of the end surfaces of the rotor core; a plurality of through holes which pierce through both of the end surface members and the rotor core along the rotational axial direction; and rivets for uniting the both end surface members and the rotor core by using the through holes, and each of the through holes is formed between the pair of magnets which face each other between adjacent magnetic poles and each oval vent duct inclined in the counter rotational direction is formed on a position outside the through hole on the center portion of the magnetic pole.

Caulking portions for mutually laminating iron plates for the rotor and caulking are formed on the center portions of the magnetic poles.

Further, caulking portions for mutually laminating iron plates for the rotor and caulking are formed between the through holes and the vent ducts.

In bridge portions which are formed on the tips of the outer periphery of the slots and which face each other between the adjacent magnetic poles, notched portions are formed on the outer periphery of forward bridge portions in the rotational direction.

Further, reseted portions are formed on the forward magnetic poles in the rotational direction on the outer periphery of the rotor.

The slot is formed into an L-shaped form so that a perpendicular portion faces the center of the rotor, one flat permanent magnet is inserted to each linear portion, and an air gap that is larger than the width of linear portion is formed in the perpendicular portion.

Further, engaging portions for engaging the inserted flat permanent magnets are formed in the inner peripheries of the slots.

The bridge portion formed on the tips of the outer periphery of each slot is formed so that the width is equal to 0.3 mm or more and is equal to 0.5 mm or less.

An inner diameter of the iron plate for the rotor of the both end portions constituting the rotor core is formed so as to be slightly larger than that of the iron plate for the rotor on the center portion.

When it is assumed that an outer diameter of the rotor core is set to D, the thickness of laminated layers is set to L, the thickness of magnet is set to t, and the length of magnet is set to I, the rotor is constructed so as to satisfy the following expressions (1) and (2).

$0.30 < L/D < 1.20$ ... (1)

$0.02 < t/I < 0.20$ ... (2)

Further, the rotor has: a rotor core formed by laminating the plurality of iron plates for the rotor in which the thickness of plate is equal to 0.3 mm or more and is equal to 0.5 mm or less; end surface members which are made of a non-magnetic material and which close the slots arranged on the both end surfaces of the rotor core; a balance weight which is attached to at least one of the end surface members; a plurality of through holes which pierce the balance weight, both end surface members, and rotor core along the rotational axial direction and each of which is formed between the pair of magnets that face each other between adjacent magnetic poles; and rivets for uniting the both end surface members and rotor core by using the through holes.

The end surface members are formed into a ring-shaped form, its inner diameter is formed so as to be larger than that of the rotor core, and its outer diameter is formed so as to be smaller than that of the rotor core.

The through holes of the end surface members are formed so as to be larger than the through holes of the rotor core.

DETAILED DESCRIPTION OF THE PREFERRED EMBODIMENTS

Embodiments of the present invention will now be described in detail hereinbelow with reference to the drawings.

Figure 1:
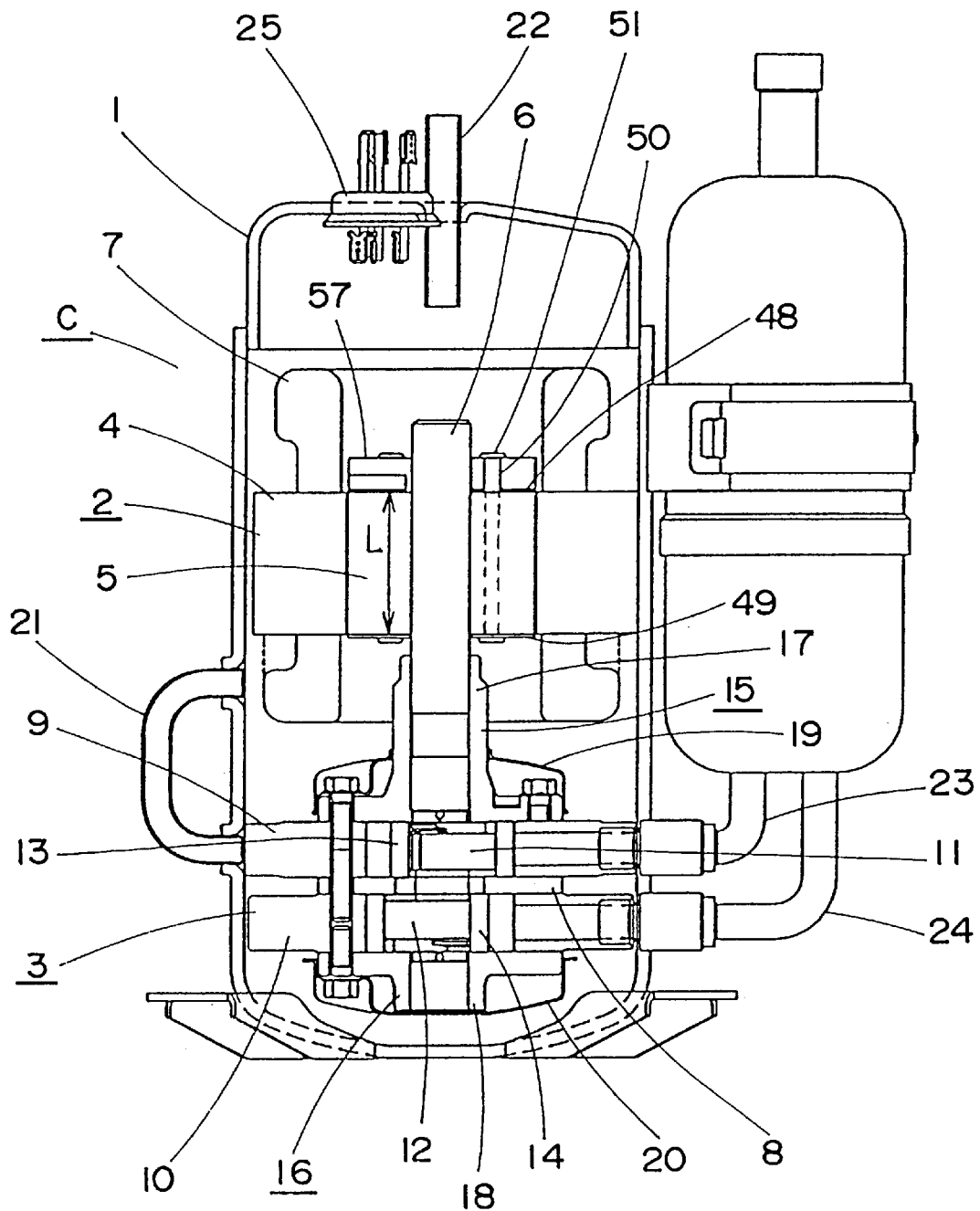
FIG. 1 is a vertical sectional side view of a compressor to which the invention is applied.

FIG. 1 is a vertical sectional side view of a compressor C to which a rotor of an electric motor of the invention is applied. In the diagram, reference numeral 1 denotes a sealed housing in which an electric motor (brushless DC motor) 2 and a compression element 3 which is rotated by the electric motor 2 are enclosed on the upper and lower sides, respectively. After the electric motor 2 and compression element 3 were enclosed to the sealed housing 1 which has been previously divided into two portions, the housing 1 is sealed by high frequency welding or the like.

The electric motor 2 comprises: a stator 4 which is fixed to an inner wall of the sealed housing 1; and a rotor 5 which is rotatably supported in the stator 4 so as to set a rotation axis 6 to the center. The stator 4 has a stator winding 7 for applying a rotating magnetic field to the rotor 5.

The compression element 3 has a first rotary cylinder 9 and a second rotary cylinder 10 which are partitioned by an intermediate partition 8. Eccentric portions 11 and 12 which are rotated by the rotation axis 6 are attached to the cylinders 9 and 10, respectively. A phase of an eccentric position of the eccentric portion 11 deviates from that of the eccentric position 12 by 180 degrees.

Reference numerals 13 and 14 denote first and second rollers which rotate in the cylinders 9 and 10, respectively. The rollers 13 and 14 rotate in the cylinders due to the rotation of the eccentric portions 11 and 12, respectively. Reference numeral 15 and 16 denote first and second frames. The first frame 15 defines a compressed space closed by the cylinder 9 in a portion with the partition 8. The second frame 16 similarly defines a compressed space closed by the cylinder 10 in a portion with the partition 8. The first and second frames 15 and 16 have bearings 17 and 18 for axially supporting the lower portion of the rotation axis 6 so as to be rotatable, respectively.

Reference numerals 19 and 20 denote discharge mufflers. They are attached so as to cover the first and second frames 15 and 16, respectively. The cylinder 9 communicates with the discharge muffler 19 by a discharge hole (not shown) provided for the first frame 15. The cylinder 10 communicates with the discharge muffler 20 by a discharge hole (not shown) provided for the second frame 16. Reference numeral 21 denotes a by-pass pipe arranged outside the sealed housing 1. The pipe communicates with an internal portion of the discharge muffler 20.

Reference numeral 22 denotes a discharge pipe provided on the sealed housing 1; 23 and 24 suction pipes which communicate with the cylinders 9 and 10, respectively; and 25 a sealed terminal for supplying an electric power from the outside of the sealed housing 1 to the stator winding 7 of the stator 4 (a lead wire for connecting the sealed terminal 25 and stator winding 7 is not shown).

Figure 2:
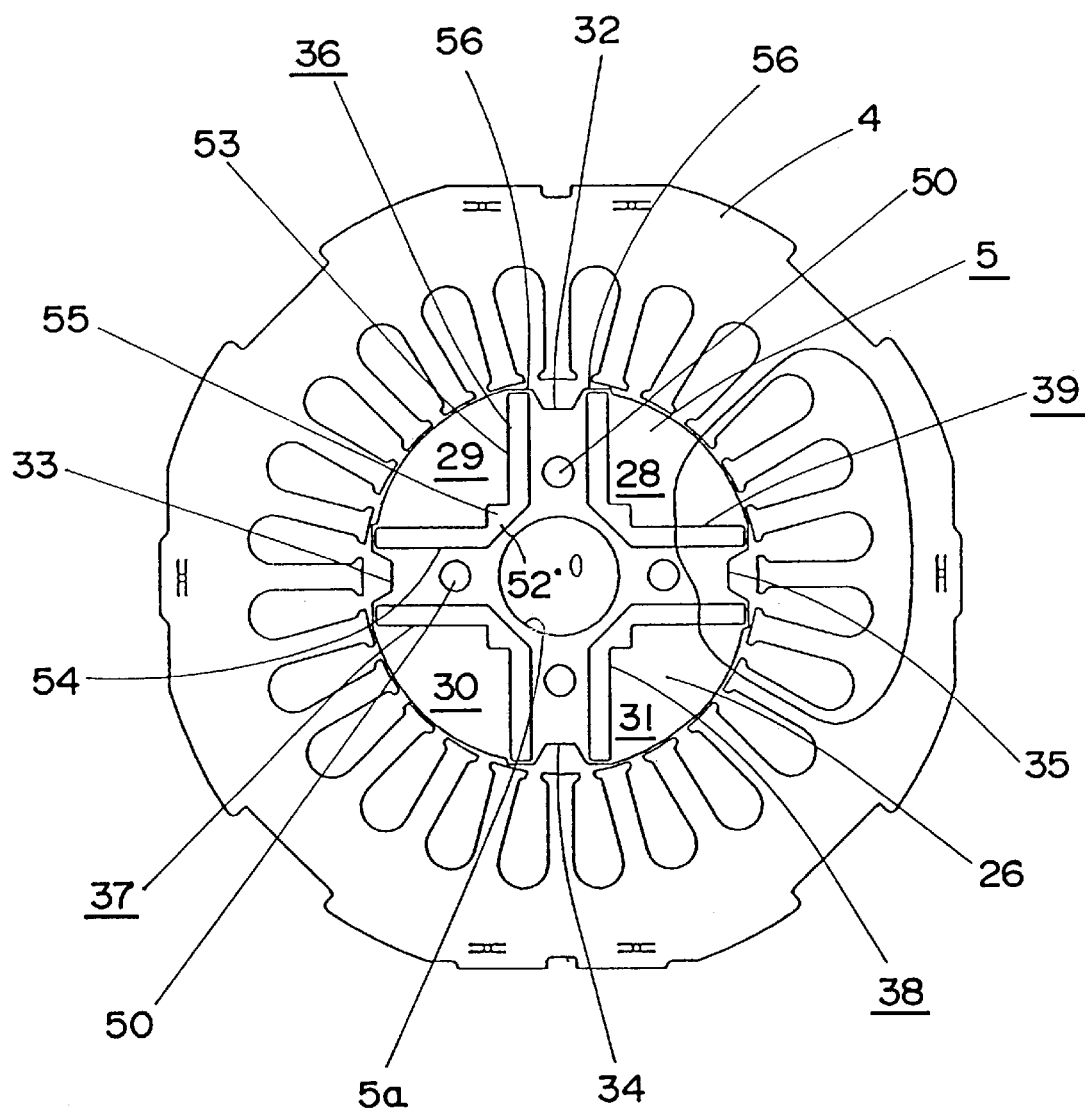
FIG. 2 is a plan view showing a rotor and a stator of the invention.
Figure 3:
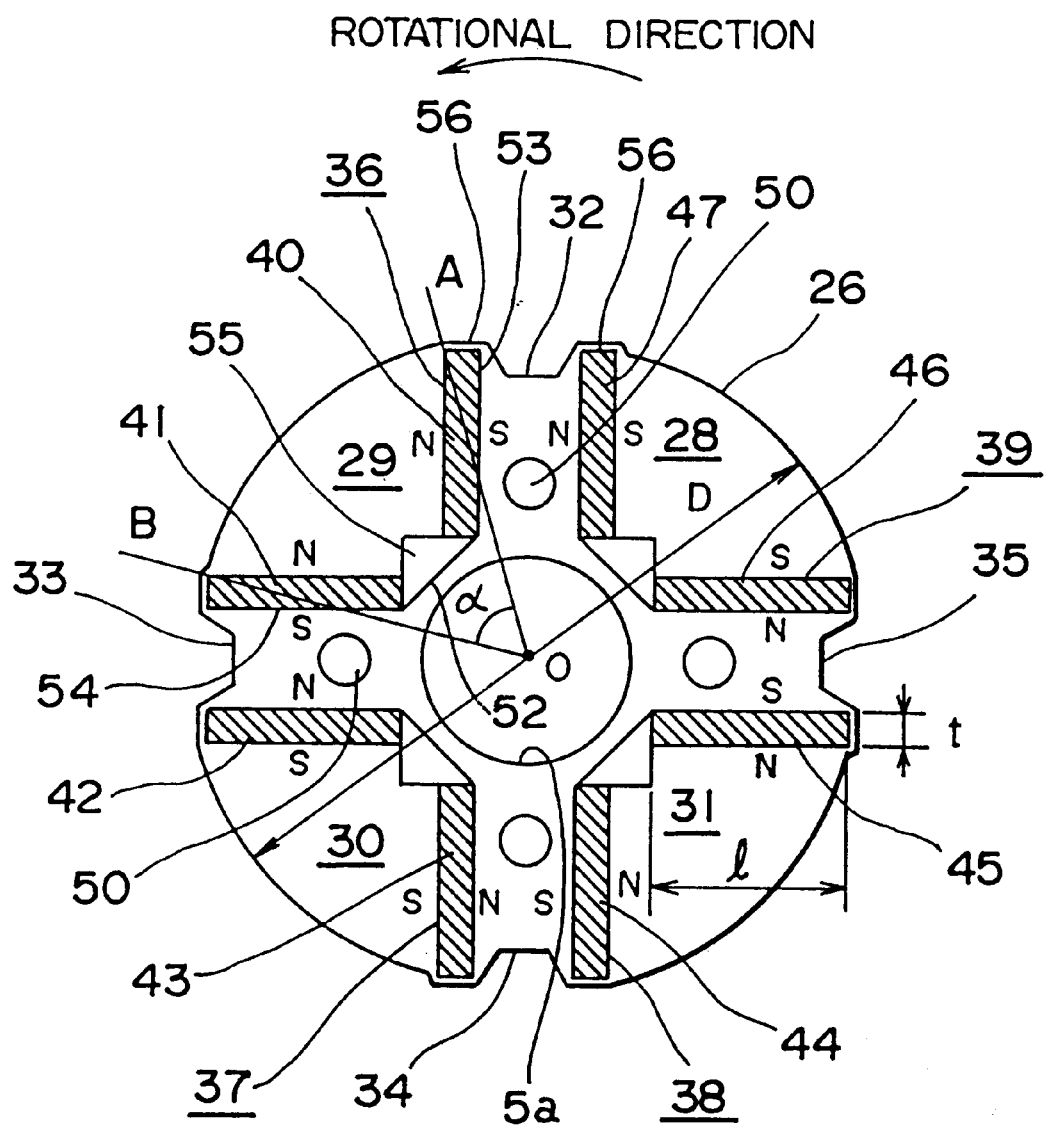
FIG. 3 is a plan view of the rotor of the invention.
Figure 4:
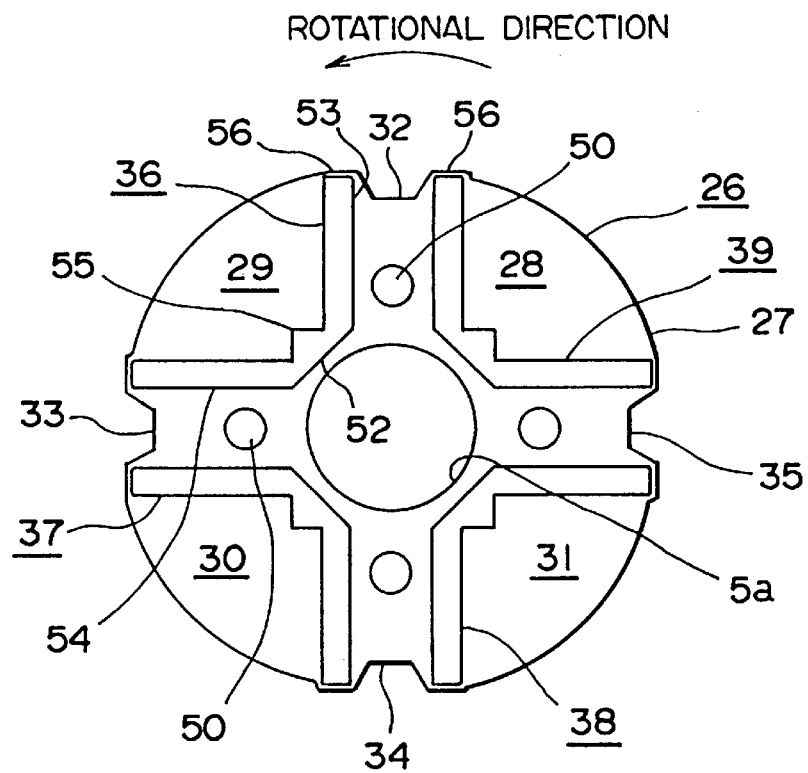
FIG. 4 is a plan view of a core for the rotor constituting the rotor of the invention.
Figure 5:
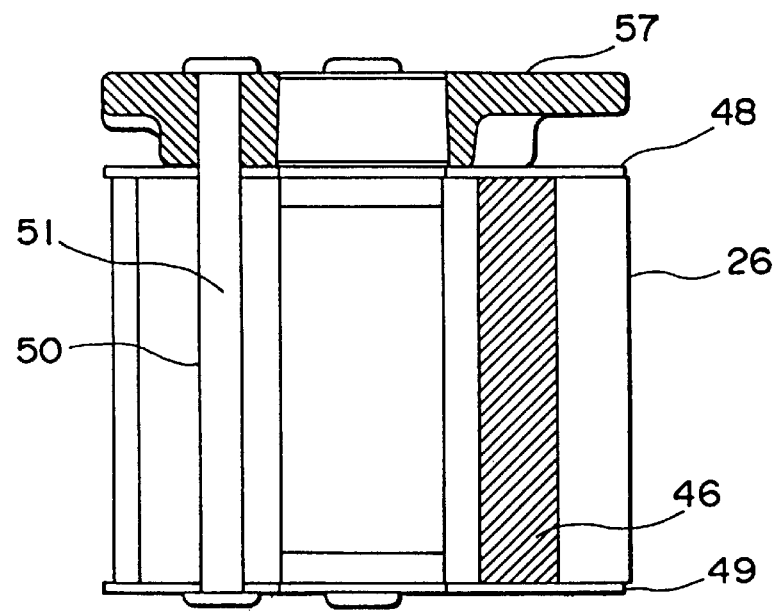
FIG. 5 is a side sectional view of a rotor showing another embodiment of the invention and shows a vertical sectional view taken along 5—5 in FIG. 6.

FIG. 2 is a plan view of a main portion showing the positional relation of the stator 4 and rotor 5. FIG. 3 is a plan view of the rotor 5 in which the permanent magnets have been loaded. FIG. 4 is a plan view of a rotor core (in a state before the permanent magnets are pressed and fit.

In the diagrams, reference numeral 26 denotes a rotor core constructed in such a manner that a plurality of iron plates 27 for the rotor obtained by cutting out an electromagnetic steel plate of a thickness of 0.3 mm to 0.7 mm into a form as shown in FIG. 4 are laminated and united by caulking each other.

The iron plate 27 for the rotor is cut out from the electromagnetic steel plate so as to form magnetic pole portions 28 to 31 constituting magnetic poles of four poles as shown in FIG. 3. In this instance, it is assumed that an outer diameter D between the tops of the magnetic pole portions 28 to 31 lies within a range from 30 mm to 70 mm. In the embodiment, for example, it is 50 mm.

Reference numerals 36 to 39 denote four L-shaped slots formed in the rotor core 26 along the axial direction of the rotation axis 6. Reference numerals 40 to 47 denote eight flat permanent magnets inserted in the slots 36 to 39.

As the permanent magnets 40 to 47, the pairs of magnets 40 to 47 which face each other are arranged in parallel at predetermined intervals between the adjacent magnetic poles 28, 29, 30, and 31 so as to sandwich normal lines of the rotor 5. Concave vent ducts 32 to 35 are formed on the outer periphery between the pairs of magnets 40 to 47.

The eight permanent magnets 40 to 47 have been inserted in the slots 36 to 39 so that an angle formed between tips (for example, A and B) of the outer periphery of the pairs of magnets (for example, 40 and 41) constituting the magnetic poles 28 to 31 and a center 0 of the rotor 5 lies within a range from 55 to 70 degrees.

The rotor 5 has: end surface members 48 and 49 for closing the slots on the both end surfaces of the rotor core 26; a plurality of through holes 50 which pierce through both of the end surface members 48 and 49 and rotor core 26 along the rotational axial direction; and rivets 51 for uniting the both end surface members 48 and 49 and the rotor core 26 by using the through holes. The through holes 50 are formed between the pairs of magnets 40 to 47 which face each other between the adjacent magnetic poles 28 to 31.

When the explanation is made with respect to the slots 36 to 39 by using the slot 36 as an example, the slot 36 is formed into an L-shaped form so that a perpendicular portion 52 faces the center O of the rotor 5, the flat permanent magnets 40 and 41 are inserted into linear portions 53 and 54, respectively, and an air gap 55 that is larger than the width of each of the linear portions 53 and 54 is formed in the perpendicular portion 52.

Bridge portions 56 formed on the tips of the outer periphery of the slots 36 to 39 are formed so as to have a width of 0.3 mm or more and 0.5 mm or less.

An inner diameter of the iron plates 27 for the rotor on the both ends constituting the rotor core 26 is formed so as to be slightly larger than that of the iron plates 27 for the rotor of the center portion.

When it is assumed that an outer diameter of the rotor core 26 is set to D, the thickness of laminated layers is set to L, the thickness of magnet is set to t, and the length of magnet is set to I, the rotor 5 is constructed so as to satisfy the following expressions (1) and (2).

$0.30 < L/D < 1.20$ ... (1)
$0.02 < b/I < 0.20$ ... (2)

Further, a balance weight 57 having an oil separating function is attached to the top of the end surface member 48.

In the rotor of the electric motor constructed as mentioned above, since as the permanent magnets 40 to 47, each pair of magnets 40 to 47 which face each other are arranged in parallel at predetermined intervals so as to sandwich the normal line of the rotor 5, the magnets can be effectively arranged in a restricted space, the characteristics can be improved, the magnetic paths at the foregoing intervals can be held, and a reluctance torque can be put to practical use. Since the magnets 40 to 47 are flat, a molding is simple and all of the magnets with the same shape can be used, so that a productivity is improved and a reduction in costs can be promoted.

Since the concave vent ducts 32 to 35 are formed on the outer periphery between the pairs of magnets 40 to 47, the magnets can suppress a magnetic flux leakage which occurs in a tooth of the stator 4 on the outer periphery. That is, the lines of magnetic force flow too much without the concave vent ducts 32 to 35, a core loss increases, so that the characteristics deteriorate.

Since the eight permanent magnets 40 to 47 have been inserted in the slots 36 to 39 so that the angle formed between the tips A and B of the outer periphery of the pairs of the magnets (for example, 40 and 41) constituting the magnetic poles 28 to 31 and the center 0 of the rotor 5 lies within a range from 55 to 70 degrees, the angle of the magnetic pole can be optimized, so that the effective use of the magnetic flux can be realized.

Since the through holes 50 to which the rivets 51 are inserted have been formed between the pairs of magnets 40 to 47 which face each other, respectively, among the adjacent magnetic poles 28 to 31 and the holes are formed by ferromagnetic, the characteristics are not deteriorated.

Since the slots 36 to 39 (for example, 36) are formed into an L-shaped form so that the perpendicular portion 52 faces the center 0 of the rotor 5, the flat permanent magnets 40 and 41 are inserted to the linear portions 53 and 54, respectively, and the air gap 55 that is larger than the width of each of the linear portions 53 and 54 is formed on the perpendicular portion 52, a leakage of the magnetic flux on the inner end portion of each of the magnets 40 to 47 can be suppressed. That is, when there is no air gap 55, the line of magnetic force is leaked at the time when the magnets 40 to 47 are polarized.

Since the bridge portions 56 formed on the tips of the outer peripheral of the slots 36 to 39 are formed so as to have a width of 0.3 mm or more and 0.5 mm or less, a magnetic leakage in each of the bridge portions 56 can be suppressed.

Since the inner diameter of the iron plates 27 for the rotor of the both end portions constituting the rotor core 26 is formed so as to be slightly larger than that of the iron plates 27 for the rotor of the center portion, a reduction in inner diameter of the end portion of the rotor 5 due to a hit of the outer diameter portion of the rotor 5 can be restrained.

When it is assumed that the outer diameter of the rotor core 26 is set to D, the thickness of laminated layers is set to L, the thickness of magnetic is set to t, and the length of magnet is set to I, since the rotor 5 is constructed so as to satisfy the foregoing expressions (1) and (2), the magnets 40 to 47 used as common parts can be effectively inserted into the rotor 5.

Further, since the balance weight 57 having the oil separating function is attached to the top of the end surface member 48, oil in refrigerant which rises through the air gap between the rotor 5 and stator 4 can be efficiently separated without specially independently providing a separator.

FIGS. 5 to 9 shows a rotor showing another embodiment. Constructions different from those of the embodiment shown in FIGS. 2 to 4 are as follows. The other constructions are substantially the same.

That is, in this case, in the rotor having: the end surface members 48 and 49 for closing the slots 36 to 39 formed on the both end surfaces of the rotor core 26; the plurality of through holes 50 which pierce through the both end surface members 48 and 49 and rotor core 26 along the rotational axial direction; the rivets 51 for uniting the both end surface members 48 and 49 and rotor core 26 by using the through holes; and the balance weight 57, the through holes 50 are formed between the pairs of magnets 40 to 47 (for example, between the magnets 40 and 47) which face each other between the adjacent magnetic poles 28 to 31 and vent ducts 60 whose diameter is smaller than that of the through hole 50 are formed in the center portions of the magnetic poles 28 to 31. Consequently, a downward return effect of the oil separated by the balance weight can be improved.

Reference numeral 61 denotes a caulking portion for laminating and caulking the iron plates for the rotor. The caulking portions are formed in the magnetic pole portions 28 to 31. Therefore, portions in which the iron plates for the rotor are easily separated are effectively fasten, so that a separation of the iron plates can be prevented.

Moreover, since each caulking portion 61 is formed backward the vent duct 60 so as to avoid the front of the magnetic pole in which the magnetic flux concentrates and is also formed on an intermediate circle between a circle which passes the four vent ducts 60 and an outer peripheral circle of the rotor, a modification of the outer periphery of the rotor 5 or modifications of the slots 36 to 39 due to the caulking can be prevented.

In bridge portions 62 and 63 which are formed on the tips of the outer periphery of the slots 36 to 39 and which face each other between the adjacent magnetic poles 28 to 31, notched portions 64 are formed on the outer periphery of the forward bridge portions 63 in the rotational direction. Consequently, a magnetic short-circuit on the ends of the magnets 40 to 47 can be prevented.

Resected portions 65 are formed on the outer periphery of forward portions of the magnetic poles 28 to 31 of the rotor 5 in the rotational direction. For example, in the magnetic pole 28, a forward diameter F in the rotational direction is formed so as to be shorter than a backward diameter E by only amount as much as the resected portion 65. Therefore, the air gap between the rotor 5 and stator 4 increases, so that it is possible to restrict a phenomenon that when the rotor 5 is rotated, forward magnetic flux waveforms in the rotational direction are distorted due to an armature reaction.

Figure 6:
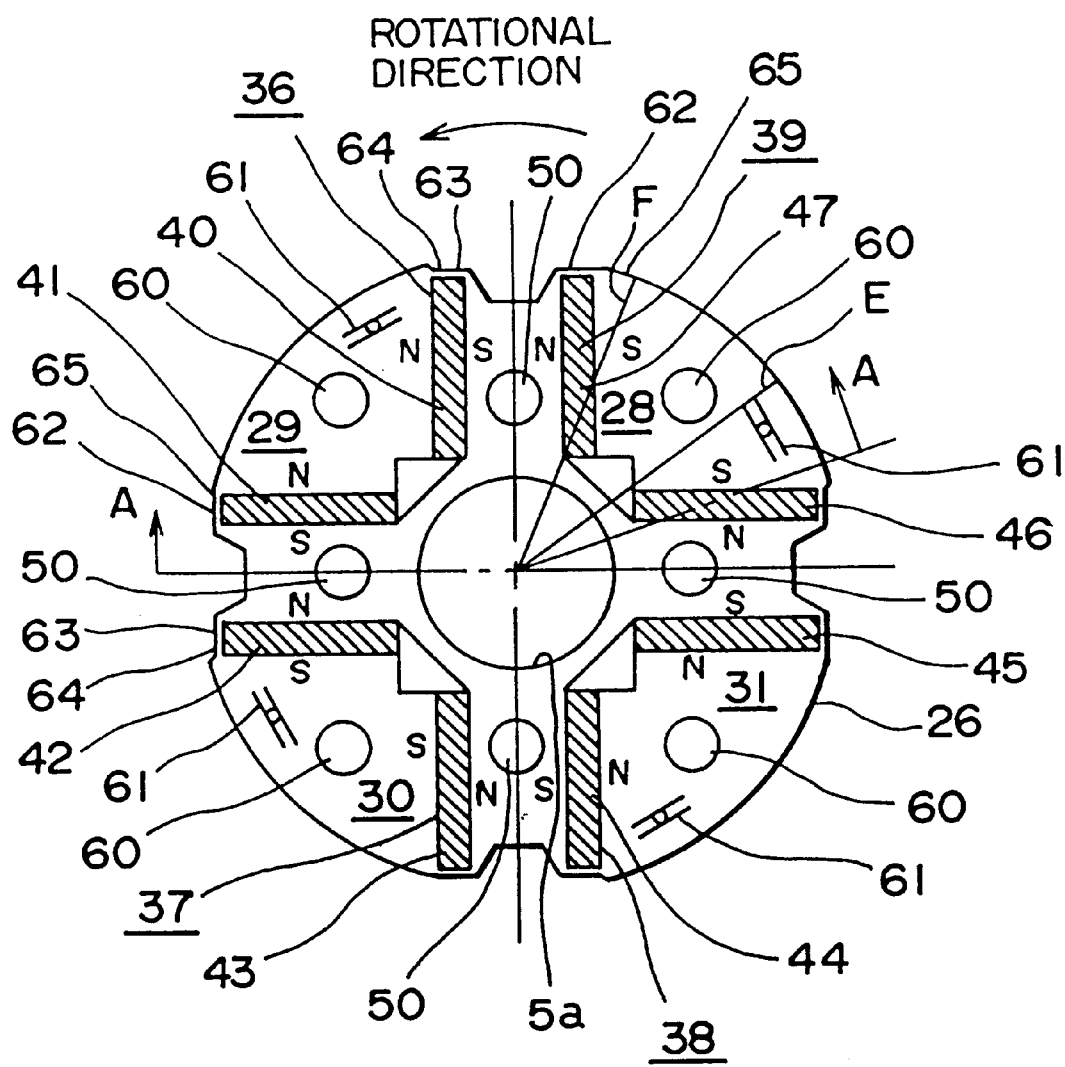
FIG. 6 is a plan view of the rotor in FIG. 5.
Figure 7:
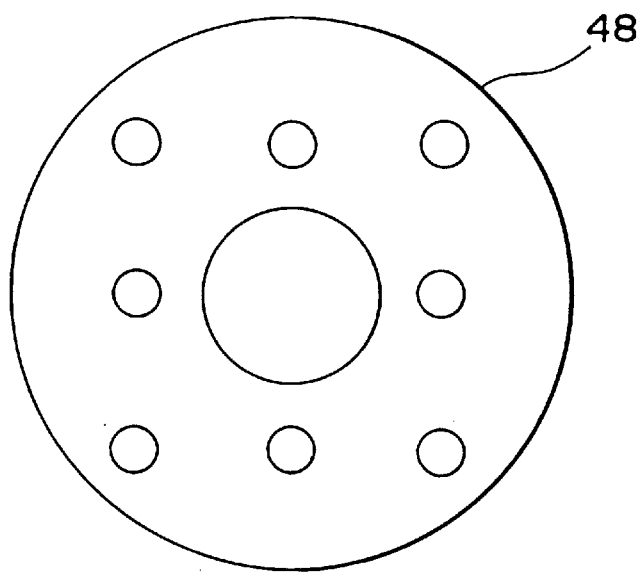
FIG. 7 is a plan view showing an end surface member of the embodiment in FIG. 5.
Figure 8:
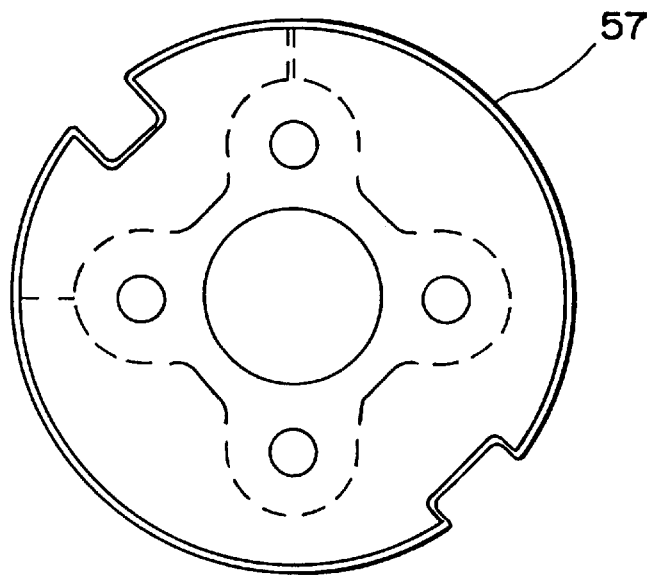
FIG. 8 is a plan view showing a balance weight in the embodiment in FIG. 5.
Figure 10:
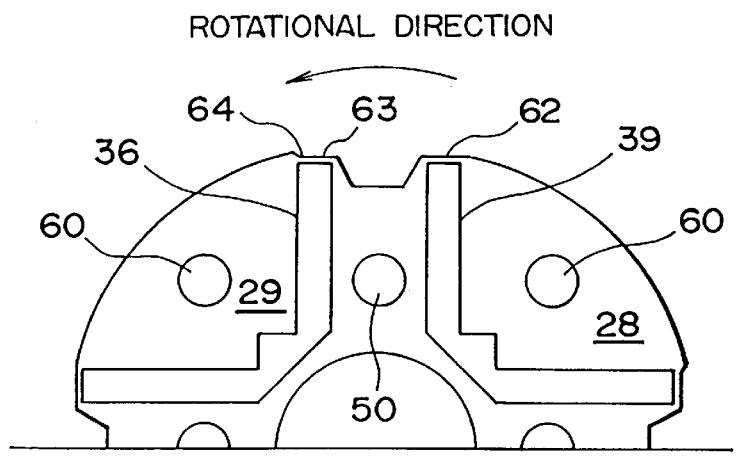
FIG. 10 is a plan view of a rotor core showing further another embodiment of the invention.
Figure 11:
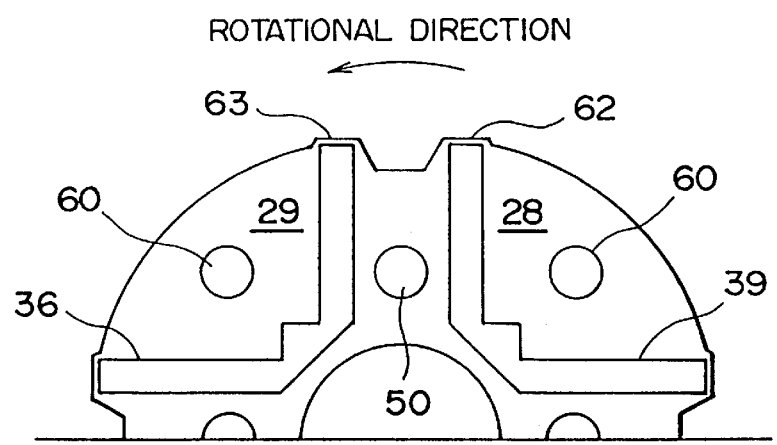
FIG. 11 is a plan view of the rotor core showing further another embodiment of the invention.
Figure 12:
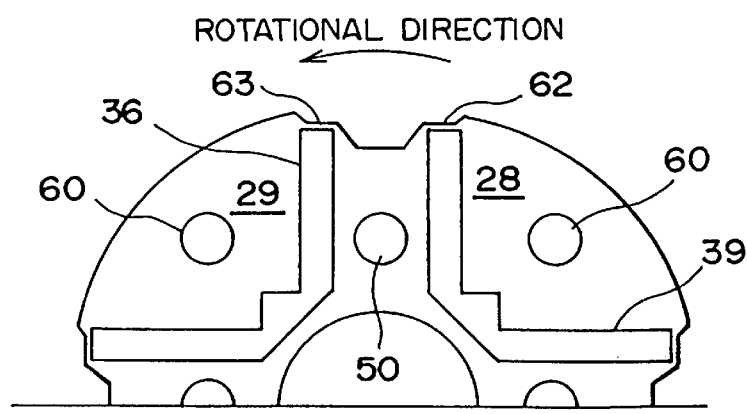
FIG. 12 is a plan view of the rotor core showing further another embodiment of the invention.

FIGS. 10 to 12 shows examples obtained by further modifying the rotor of FIG. 6. FIG. 10 shows the example in which the caulking portions 61 are disused. FIG. 11 shows the example in which the outer periphery is formed so that the bridge portions 62 and 63 are protruded outward in the same form. FIG. 12 shows the example in which the outer periphery is formed so that the magnetic pole portions 28 to 31 are protruded outward in the same form.

Figure 13A:
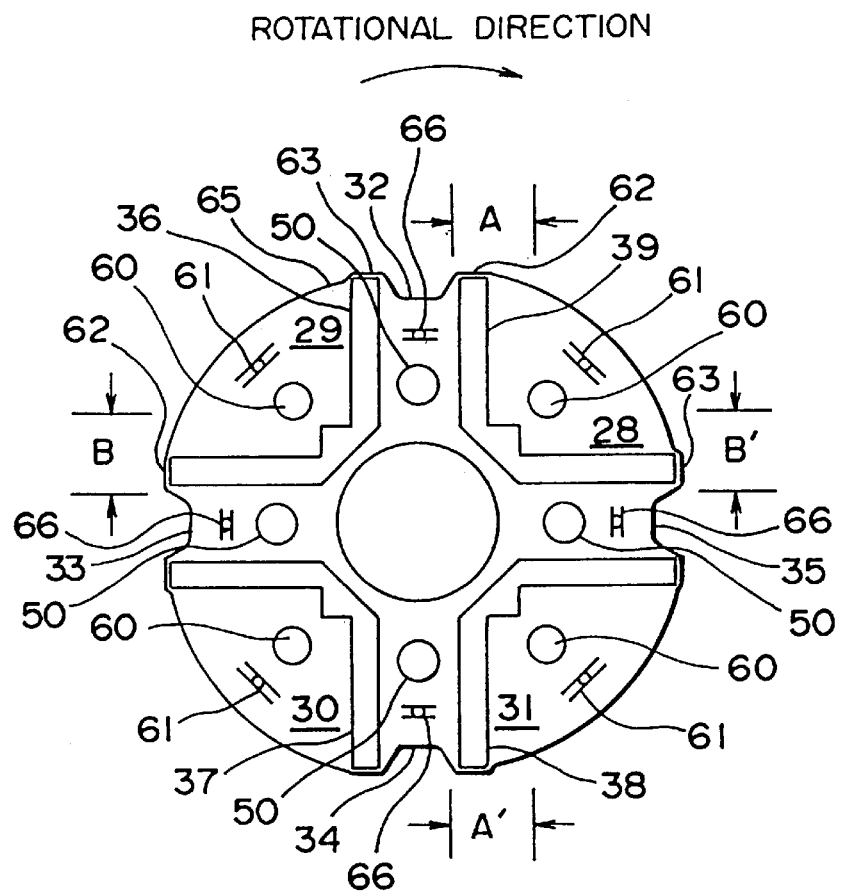
FIGS. 13A and 13B show a plan view of a rotor core showing further another embodiment of the invention and an enlarged view of each of portions A and B.

Further, FIG. 13(A) shows an example in which the resected portions 65 are formed forward in the rotational direction. For example, in the magnetic pole 28, since the resected portion 65 is formed near the bridge portion 63, the bridge portion 63 is formed so as to protrude outward. Consequently, it is possible to restrain a phenomenon that when the rotor 5 is rotated, forward magnetic flux waveforms in the rotational direction are distorted due to the armature reaction. The caulking portions 61 are formed on the center portions of the magnetic poles 28 to 31 and, as will be disclosed in claim 7, caulking portions 66 are also formed in areas surrounded by the slots 36 to 39, vent ducts 32 to 35, and through holes 50, thereby fixing the plates more firmly.

Figure 13B:
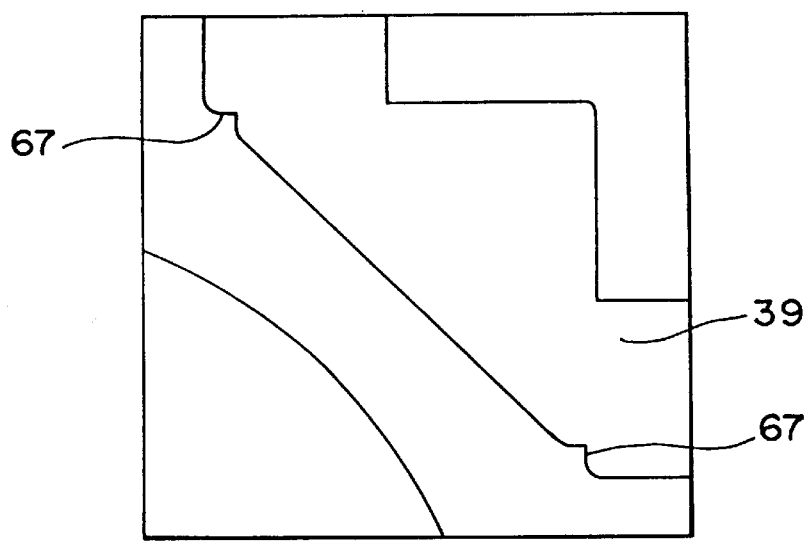

Further, in the slots 36 to 39, protruded portions 67 are formed on the end portions near the center of the rotor, thereby stably engaging the magnets. An enlarged view of the portions is shown in FIG. 13(B).

Figure 14:
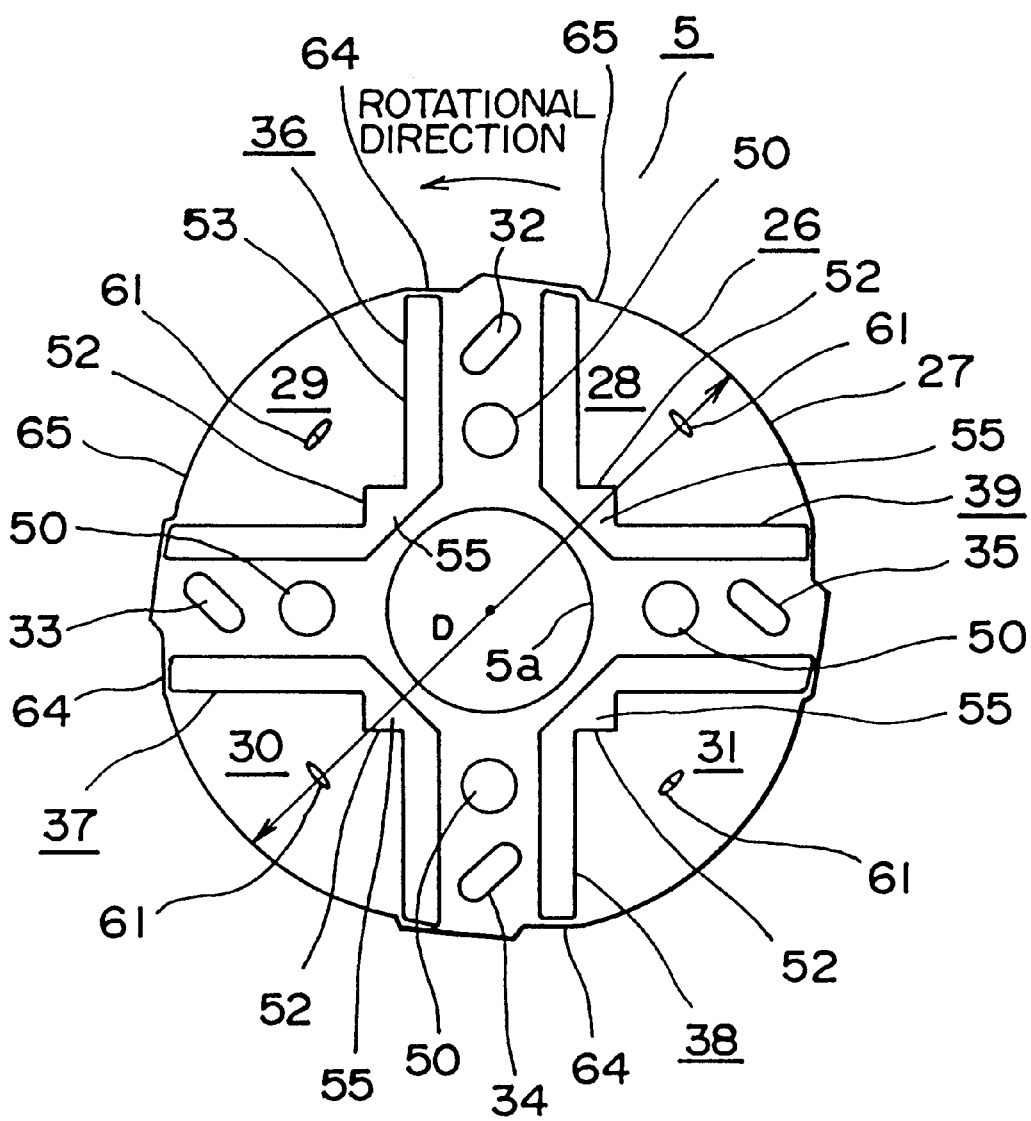
FIG. 14 is a plan view of a rotor core showing further another embodiment of the invention.
Figure 15:
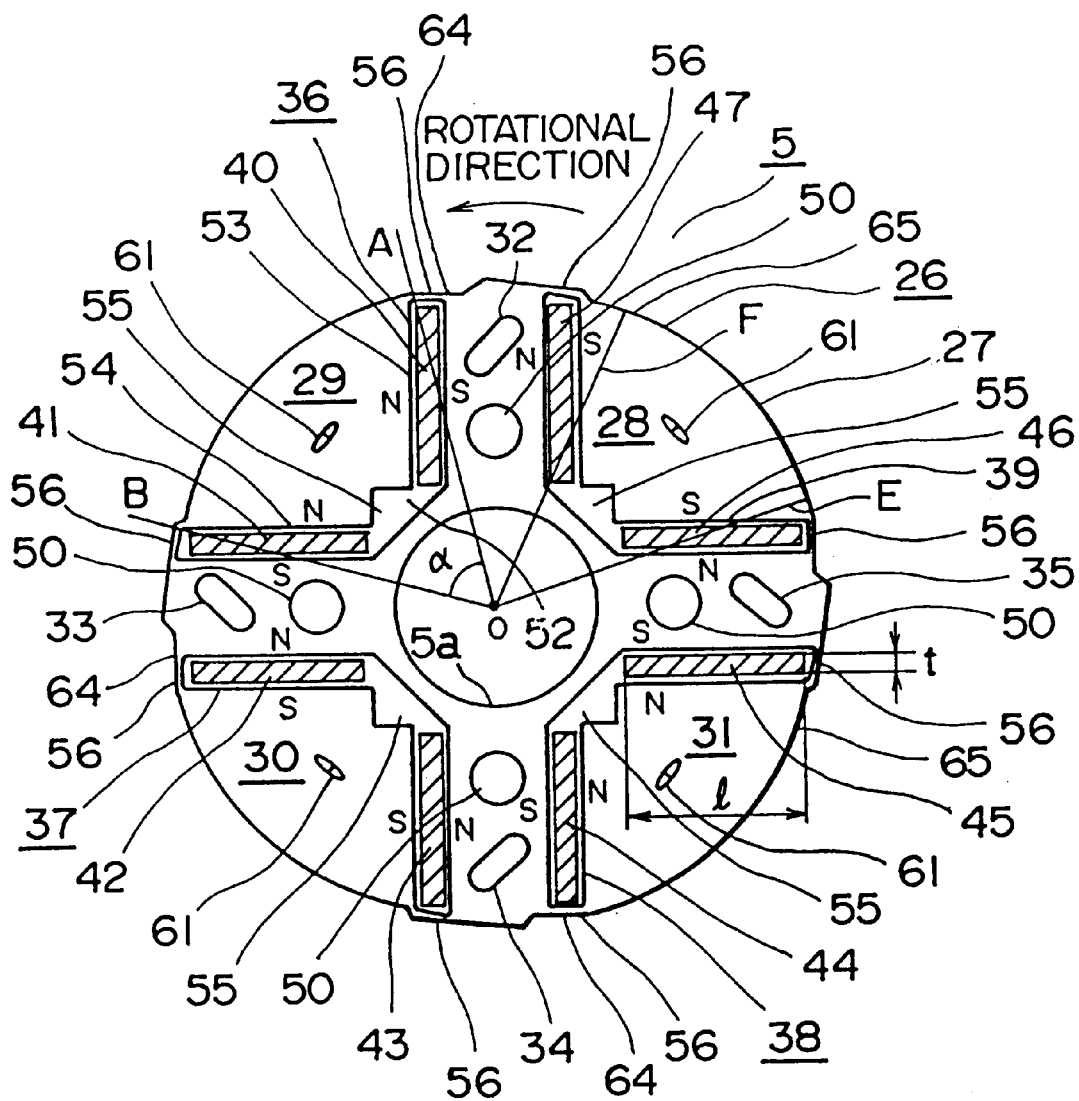
FIG. 15 is a plan view of the rotor of an example shown in FIG. 14.
Figure 16:
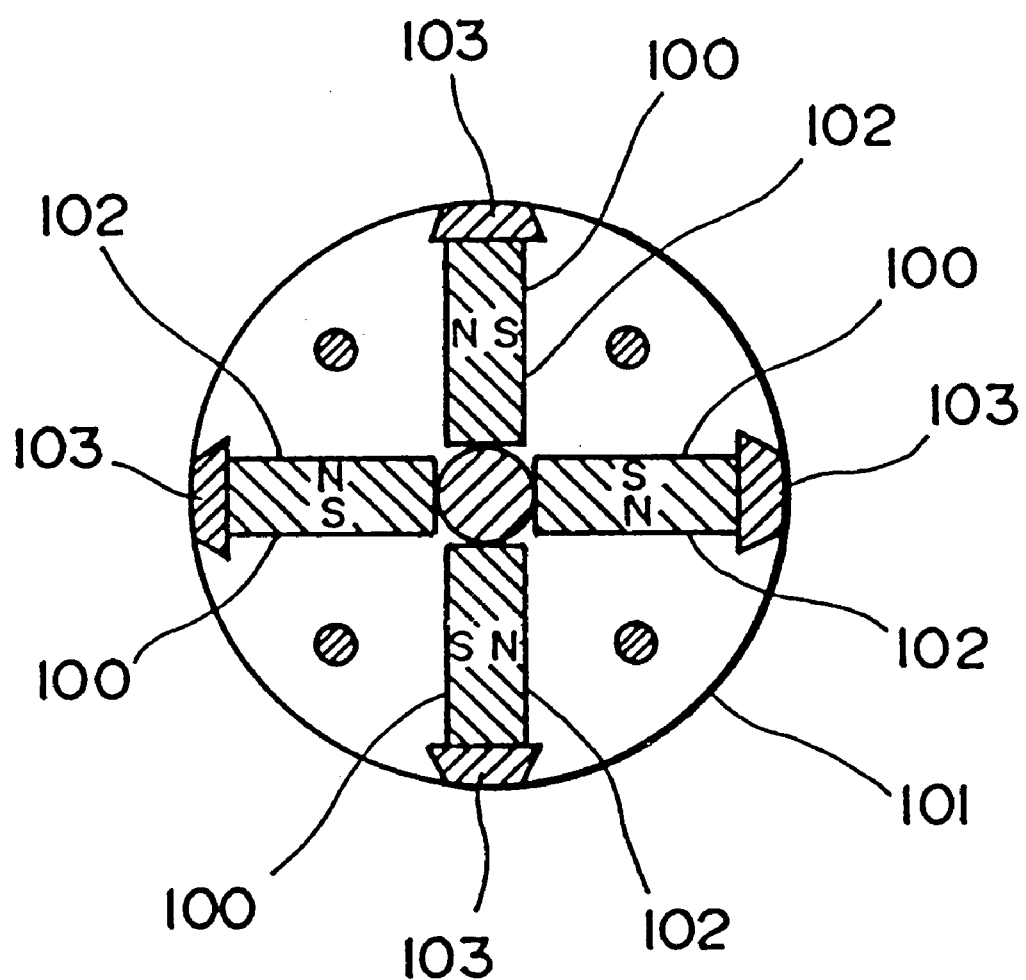
FIG. 16 is a plan view of a rotor showing a conventional example.

FIGS. 14 and 15 show further another embodiment of the rotor 5 of the invention. Constructions different from those of the embodiment shown in FIGS. 2 to 4 are as follows and the other constructions are substantially the same.

That is, in this case, as the permanent magnets 40 to 47, the pairs of magnets 40 to 47 which face each other between the adjacent magnetic poles 28, 29, 30, and 31 are arranged in parallel at predetermined intervals so as to sandwich the normal lines of the rotor 5 and the oval vent ducts 32 to 35 inclined in the counter rotational direction of the rotor 5 are formed near the outer periphery between the pairs of magnets 40 to 47.

As mentioned above, in case of the embodiment, since the oval vent ducts 32 to 35 inclined in the counter rotational direction are formed between the pairs of magnets 40 to 47, an oil separating effect can be promoted without deteriorating the characteristics by blocking the lines of magnetic force.

Reference numeral 61 denotes the caulking portions for laminating the iron plates for the rotor and caulking. Each caulking portion is formed on the center of each of the magnetic poles 28 to 31. Therefore, portions in which the iron plates 27 for the rotor are easily separated are effectively fastened, thereby enabling to prevent a separation of the iron plates.

In the bridge portions 62 and 63 which are formed on the tips of the outer periphery of the slots 36 to 39 and which face each other between the adjacent magnetic poles 28 to 31, the notched portions 64 are formed on the outer periphery of the forward bridge portions 63 in the rotational direction. Accordingly, the magnetic short-circuit on the ends of the magnets 40 to 47 can be prevented.

In the rotor 5, the resected portions 65 are formed on the forward outer peripheries of the magnetic poles 28 to 31 in the rotational direction. For example, in the magnetic pole 28, the forward outer diameter F in the rotational direction is formed so as to be shorter than the backward outer diameter E by the only amount as much as the resected portion 65. Therefore, the air gap between the stator 4 and the rotor 5 increases, so that it is possible to restrict a phenomenon that when the rotor 5 is rotated, the forward magnetic flux waveforms in the rotational direction are distorted due to the armature reaction.

The rotor 5 constructed as mentioned above is constructed in such a manner that a hole 5a formed on the center of the iron plates 27 for the rotor is shrunk and fit to the rotation axis 6.

The permanent magnet in the above embodiments is made of a rare earth magnet material such as praseodymium magnet or neodymium magnet whose surface has been nickelled. The external form of the magnet is set to be rectangular as mentioned above.

The flat end surface members 48 and 49 attached to the upper and lower ends of the rotor core 26 are made of a non-magnetic material such as aluminum or resin material and are cut into the almost same shape as that of the iron plates 27 for the rotor.

When a direct current is supplied to the stator winding 7 of the stator 4, the rotor 5 rotates in the direction shown by an arrow in FIG. 6 due to repulsion and attraction with magnetic fields which occur from the permanent magnets 40 to 47 at a speed balanced by a voltage and a load which are applied to the stator winding 7 (the speed is varied within a range from 500 rpm to 10000 rpm by, for example, changing the applied voltage). The rotation axis 6 is rotated by the rotation of the rotor 5, so that the eccentric portions 11 and 12 are rotated. Consequently, the first and second rollers 13 and 14 are rotated, so that the compressor displays a compression action.

Figure 9:
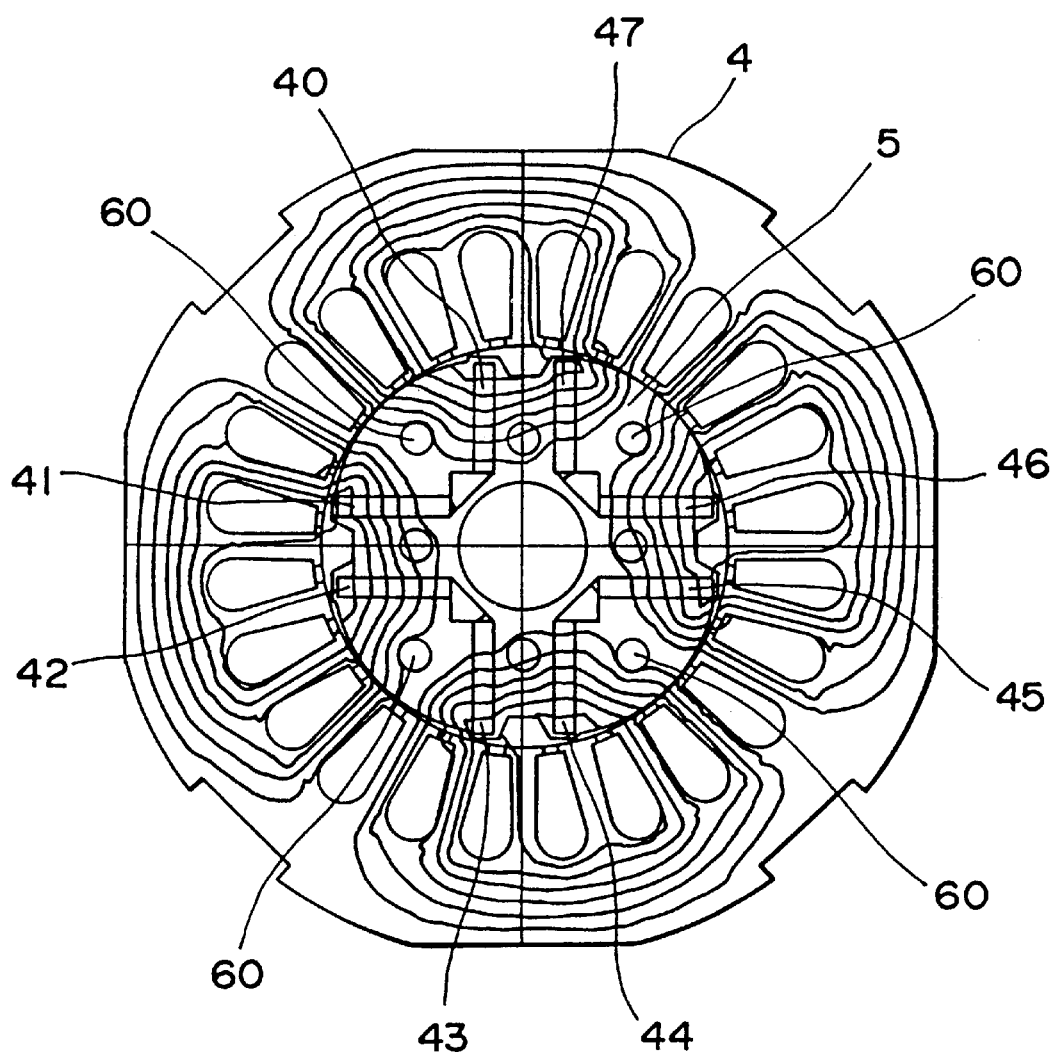
FIG. 9 is a plan view showing lines of magnetic force which pass the stator and rotor of the embodiment in FIG. 5.

In this instance, a state of the magnetic fields formed by the permanent magnets 40 to 47 in the rotor core 26 is shown in FIG. 9. FIG. 9 shows a plan view of the rotor core 26. In this instance, concentric magnetic fields as shown by spiral curves in the diagram are formed between the adjacent, for example, magnets 40 to 47 pressed and fit to the slots 36 to 39 and the magnetic poles 28 to 31.

Although the invention has been applied to the rotor having the four magnetic poles in the embodiments, the invention is not limited to it but it is effectively used in a rotor of an electric motor having four or more magnetic poles, for example, eight magnetic poles or the like. In the embodiment, the iron plates 27 for the rotor have been mutually caulked and fixed by the caulking portion 61. The invention is not limited to the embodiment but it is also effectively applied to a structure constructed in such a manner that the iron plates 27 for the rotor are laminated and fixed by welding, thereby constituting the rotor core 26 and the upper and lower end surface members 48 and 49 are caulked and fixed to the rotor core 26 by the rivets 51.

As described in detail above, according to the invention, since as the permanent magnets, the pairs of magnets which face each other are arranged in parallel at predetermined intervals so as to sandwich the normal lines of the rotor, the magnets can be effectively arranged in a restricted space, the characteristics can be improved, the magnetic paths at the above intervals can be held, and a reluctance torque can be put to practical use. Since the magnets are flat, a molding is simple and all of the magnets with the same shape can be used, so that a productivity is improved and a reduction in costs can be promoted.

Since the concave vent ducts are formed on the outer periphery between the pairs of magnets, each magnet can suppress a magnetic flux leakage which occurs in a tooth of the stator on the outer periphery.

Further, since as the eight permanent magnets, eight permanent magnets have been inserted in the slots so that the angle formed between the tips of the outer periphery of the pairs of the magnets constituting the magnetic poles and the center of the rotor lies within a range from 55 to 70, the angle of the magnetic pole can be optimized, so that the effective use of the magnetic flux can be realized.

Since the through holes to which the rivets are inserted have been formed between the pairs of magnets which face each other between the adjacent magnetic poles and the holes are formed by ferromagnetic, the characteristics are not deteriorated.

Since the slots are formed into an L-shaped form so that the perpendicular portion faces the center of the rotor, the flat permanent magnets are inserted to the linear portions, respectively, and the air gap that is larger than the width of each of the linear portions is formed on the perpendicular portion, a leakage of the magnetic flux on the inner end portion of the magnets can be suppressed.

Since the bridge portions formed on the tips of the outer periphery of the slots are formed so as to have a width of 0.3 mm or more and 0.5 mm or less, a magnetic leakage in each bridge portion can be suppressed.

Since the inner diameter of the iron plates for the rotor of the both end portions constituting the rotor core is formed so as to be slightly larger than that of the iron plates for the rotor of the center portion, a reduction in inner diameter of the end portion of the rotor due to a hit of the outer diameter portion of the rotor can be restrained.

When it is assumed that the outer diameter of the rotor core is set to D, the thickness of laminated layers is set to L, the thickness of magnetic is set to t, and the length of magnet is set to I, since the rotor is constructed so as to satisfy the following expressions (1) and (2), the magnets used as common parts can be effectively inserted into the rotor.

$0.30 < L/D < 1.20$ ... (1)

$0.02 < t/I < 0.20$ ... (2)

Further, since the balance weight having the oil separating function is attached to the top of the end surface member, oil in refrigerant which rises through the air gap between the rotor and stator can be efficiently separated without specially independently providing a separator.

Since the through holes are formed between the pairs of magnets which face each other between the adjacent magnetic poles and the vent ducts whose diameter is smaller than that of the through hole are formed in the center portions of the magnetic poles, a downward return effect of the oil separated by the balance weight can be improved.

Since the caulking portions for laminating and caulking the iron plates for the rotor are formed in the magnetic pole portions, portions in which the iron plates for the rotor are easily separated are effectively fasten, so that a separation of the iron plates can be prevented. Further, by also arranging the caulking portions between the vent ducts and through holes, the iron plates can be fastened more firmly. In this instance, in order to arrange the caulking portions formed in the magnetic poles at regular intervals, it is desirable to define each of them on the center of the magnetic pole.

Since each caulking portion is formed backward the vent duct so as to avoid the front of the magnetic pole in which the magnetic flux concentrates and is also formed on the intermediate circle between the circle which passes the four vent ducts and the outer peripheral circle of the rotor, a modification of the outer periphery of the rotor or modifications of the slots due to the caulking can be prevented.

Since the oval vent ducts inclined in the counter rotational direction are formed between the pairs of magnets, areas of the vent ducts can be largely held along the magnetic paths and the oil separating effect can be promoted without deteriorating the characteristics by blocking the lines of magnetic force.

Since the caulking portions for laminating the iron plates for the rotor and caulking are formed on the magnetic poles, portions in which the iron plates for the rotor are easily separated are effectively fastened, thereby enabling to prevent a separation of the iron plates.

In the bridge portions which are formed on the tips of the outer periphery of the slots and which face each other between the adjacent magnetic poles, since the notched portions are formed on the outer periphery of the forward bridge portions in the rotational direction, the magnetic short-circuit on the end portions of the magnets can be prevented.

In the rotor, the resected portions are formed on the forward outer peripheries of the magnetic poles in the rotational direction, the air gap between the stator and the rotor increases, so that it is possible to restrict a phenomenon that when the rotor is rotated, forward magnetic flux waveforms in the rotational direction are distorted due to the armature reaction.

In the bridge portions which are formed on the tips of the outer periphery of the slots and which face each other between the adjacent magnetic poles, since the notched portions are formed on the outer periphery of the forward bridge portions in the rotational direction, the magnetic short-circuit on the end portions of the magnets can be prevented.

Since the resected portions are formed on the forward or backward outer peripheries of the magnetic poles in the rotational direction in the rotor, the air gap between the stator and the rotor increases, so that it is possible to restrict a phenomenon that when the rotor is rotated, forward or backward magnetic flux waveforms in the rotational direction are distorted due to the armature reaction.

Since the engaging portions for engaging the permanent magnets which are inserted into the slots are formed in the inner peripheries of the slots, the permanent magnets can be stably engaged without deviating.

What is claimed is:

1. A rotor for an electric motor comprising:

a rotor core formed by a plurality of laminations of plates of magnetic material and having a longitudinal central axis;

a plurality of pairs of slots spaced around said core and along its length, the slots of a pair being opposed and generally parallel to each other, and the portion of the rotor core between the slot of one pair and the next adjacent slot of the next adjacent pair defining a magnetic pole portion of the rotor; and a permanent magnet in each of said slots, said magnets being generally parallel to each other; and wherein for an outer diameter D of the rotor core a thickness of the laminations being L, a thickness of magnet being t, and a length of magnet being I, the rotor is constructed such that:

$0.30 < L/D < 1.20 \ldots$ (1)

$0.02 < t/I < 0.20 \ldots$ (2).

2. A rotor as in claim 1 wherein the core longitudinal central axis lies in an extension of the space between a pair of the opposing slots in which said magnets are located.

3. A compressor comprising a compressor element for compressing an applied gas, and an electric motor for driving said compressor having a rotor as set forth in claim 1.

4. A compressor as in claim 3 wherein the rotor core longitudinal central axis lies in an extension of the space between a pair of the opposing slots in which said magnets are located.

* * * * *

UNITED STATES PATENT AND TRADEMARK OFFICE
CERTIFICATE OF CORRECTION

PATENT NO.  : 6,147,428
DATED       : November 14, , 2000
INVENTOR(S) : Masaaki Takezawa et al It is certified that error appears in the above-identified patent and that said Letters Patent is hereby corrected as shown below:

ON THE TITLE PAGE

Item [75] Inventor, change "NASAAJU Takezawa" to - - MASAAKI TAKEZAWA- -.

Signed and Sealed this

Twenty-ninth Day of May, 2001

Attest:

NICHOLAS P. GODICI

*Attesting Officer*     Acting Director of the United States Patent and Trademark Office